(12) United States Patent
Lu et al.

(10) Patent No.: US 11,452,991 B2
(45) Date of Patent: Sep. 27, 2022

(54) COPPER MESH COATED WITH MANGANESE MOLYBDATE AND APPLICATION THEREOF IN THE SEPARATION OF OIL-WATER EMULSION AND DEGRADATION OF ORGANIC POLLUTANTS IN WATER

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 357 days.

(21) Appl. No.: 16/851,918

(22) Filed: Apr. 17, 2020

(65) Prior Publication Data

US 2020/0330962 A1  Oct. 22, 2020

(30) Foreign Application Priority Data

Apr. 19, 2019 (CN) .......................... 201910319974.9

(51) Int. Cl.
*B01J 23/34* (2006.01)
*B01J 37/02* (2006.01)
*B01J 37/06* (2006.01)
*B01J 37/10* (2006.01)
*B01J 37/34* (2006.01)
*B01D 17/04* (2006.01)
*C02F 1/32* (2006.01)
*C02F 1/72* (2006.01)
(Continued)

(52) U.S. Cl.
CPC ............ *B01J 23/34* (2013.01); *B01D 17/047* (2013.01); *B01J 23/72* (2013.01); *B01J 35/004* (2013.01); *B01J 35/04* (2013.01); *B01J 37/0217* (2013.01); *B01J 37/0219* (2013.01); *B01J 37/0225* (2013.01); *B01J 37/0228* (2013.01); *B01J 37/06* (2013.01); *B01J 37/10* (2013.01); *B01J 37/343* (2013.01); *C02F 1/32* (2013.01); *C02F 1/725* (2013.01); *C02F 2101/308* (2013.01); *C02F 2101/325* (2013.01); *C02F 2305/10* (2013.01)

(58) Field of Classification Search
CPC ........ B01J 23/34; B01J 23/72; B01J 37/0217; B01J 37/0219; B01J 37/0225; B01J 37/0228; B01J 37/06; B01J 37/10; B01J 37/343; B01D 17/047; C02F 1/32; C02F 1/725

See application file for complete search history.

(56) References Cited

U.S. PATENT DOCUMENTS

| | | | |
|---|---|---|---|
| 8,828,903 B2 * | 9/2014 | Chen | .................... B01J 37/0009 502/240 |
| 9,463,442 B2 * | 10/2016 | Lin | ........................ B01J 23/686 |
| 2018/0311658 A1 * | 11/2018 | Liang | ....................... B01J 37/04 |

* cited by examiner

*Primary Examiner* — Cam N. Nguyen
(74) *Attorney, Agent, or Firm* — SZDC Law P.C.

(57) ABSTRACT

The invention aims to provide a copper mesh coated with manganese molybdate and application thereof in the separation of oil-water emulsion and degradation of organic pollutants in water. A large amount of nano-scale manganese molybdates are grown on the surface of a copper mesh through a two-step hydrothermal method. Thereby, a multifunctional composite material is prepared, which can effectively separate oil-water emulsion and degrade organic pollutants in water. The copper mesh has good recyclability. Most of all, the product is suitable for industrial production to achieve the purpose of treating water pollution.

7 Claims, 5 Drawing Sheets

(51) Int. Cl.
*B01J 23/72* (2006.01)
*B01J 35/00* (2006.01)
*B01J 35/04* (2006.01)
 C02F 101/30 (2006.01)
 C02F 101/32 (2006.01)

COPPER MESH COATED WITH MANGANESE MOLYBDATE AND APPLICATION THEREOF IN THE SEPARATION OF OIL-WATER EMULSION AND DEGRADATION OF ORGANIC POLLUTANTS IN WATER

This application claims priority to Chinese Patent Application No. 201910319974.9, filed on Apr. 19, 2019, which is incorporated by reference for all purposes as if fully set forth herein.

FIELD OF THE INVENTION

The present invention belongs to the technical field of functional materials, and particularly relates to a preparation method of a copper mesh coated with manganese molybdate and its application as an oil-water separation material.

TECHNICAL BACKGROUND

Water and oil are valuable resources for people to survive. However, a large amount of oil is discharged into water to form an oil-water emulsion, which not only causes pollution of water resources but also wastes valuable oil resources. Therefore, there is a need to develop an efficient water treatment material. Copper mesh is a kind of mesh material with good mechanical properties, easy availability, low cost and non-toxic. It is used in many fields, but it can not be directly applied to the separation of oil-water emulsion because of its poor wettability.

SUMMARY OF THE INVENTION

The object of the present invention is to provide a preparation method of a copper mesh coated with manganese molybdate. A large amount of nano-scale manganese molybdate is grown on the surface of a copper mesh through a two-step hydrothermal method. Thereby, a multifunctional composite material is prepared, which can effectively separate oil-water emulsion and degrade organic pollutants in water. The copper mesh has good recyclability. Most of all, the product is suitable for industrial production to achieve the purpose of treating water pollution.

In order to achieve the above object, the specific technical solution of the present invention is as follows:

A copper mesh coated with manganese molybdate, the preparation method of which comprises the following steps, immersing a pretreated copper mesh in a manganese salt precursor solution and hydrothermally reacting to obtain a reactive copper mesh; then, immersing the reactive copper mesh in a sodium molybdate solution and hydrothermally reacting to obtain a copper mesh coated with manganese molybdate; said manganese salt precursor includes manganese salt, sodium carbonate, and sodium citrate.

The present invention also discloses the preparation method of a copper mesh coated with manganese molybdate, comprising the following steps, immersing a pretreated copper mesh in a manganese salt precursor solution and hydrothermally reacting to obtain a reactive copper mesh; then, immersing the reactive copper mesh in a sodium molybdate solution and hydrothermally reacting to obtain a copper mesh coated with manganese molybdate; said manganese salt precursor includes manganese salt, sodium carbonate, and sodium citrate.

In the present invention, said manganese salt is preferably manganese chloride tetrahydrate The present invention also discloses a manganese chloride precursor solution, which including manganese chloride, sodium carbonate, and sodium citrate.

The present invention also discloses a method for separating oil and water, comprising the following steps:

(1) immersing the pretreated copper mesh in the manganese salt precursor solution and hydrothermally reacting to obtain a reactive copper mesh; then immersing the reactive copper mesh in a sodium molybdate solution and hydrothermally reacting to obtain a copper mesh coated with manganese molybdate; the manganese salt precursor solution includes manganese salt, sodium carbonate, and sodium citrate;

(2) introducing the oil and water to be separated into the copper mesh coated with manganese molybdate to complete the oil and water separation.

The present invention also discloses a method for degrading organic matter in water, comprising the following steps:

(1) immersing the pretreated copper mesh in the manganese salt precursor solution and hydrothermally reacting to obtain a reactive copper mesh; then immersing the reactive copper mesh in a sodium molybdate solution and hydrothermally reacting to obtain a copper mesh coated with manganese molybdate; the manganese salt precursor solution includes manganese salt, sodium carbonate, and sodium citrate;

(2) adding the copper mesh coated with manganese molybdate to the water containing organic matter, and illuminating to complete the degradation of organic matter in the water.

In the above technical solution, at room temperature, dissolving the manganese salt in water, stirring and adding sodium citrate powder in, and after stirring until the solution is colorless and transparent, adding sodium carbonate powder to obtain the manganese salt precursor solution.

Preferably, the mass ratio of the manganese salt, sodium carbonate and sodium citrate is 2.47:1.325:3.68.

In the above technical solution, the amount of substance ratio of sodium molybdate and manganese salt is 1:1.

In the above technical solution, the hydrothermal reaction to obtain the reactive copper mesh is carried out at the temperature of 160° C. for 12 hours. At this temperature, the manganese citrate will decompose and react with the sodium carbonate to produce the manganese carbonate, which grows on the surface of the copper mesh. The hydrothermal reaction to obtain the copper mesh coated with manganese molybdate is carried out at the temperature of 140° C. for 12 hours. At this temperature, the manganese carbonate reacts with the sodium molybdate to obtain the manganese molybdate.

In the above technical solution, the copper mesh is ultrasonically cleaned with acetone, ethanol and deionized water separately to obtain pretreated copper mesh. The pretreatment step can enhance the reactivity of the copper mesh, making it easier to grow crystals.

In the present invention, manganese chloride is used as a precursor, and a certain amount of manganese chloride precursor solution is configured; the pretreated copper mesh is immersed in the solution, and two-step hydrothermal reaction is carried out in the reaction kettle, and finally the copper mesh coated with manganese molybdate is obtained to use in oil-water separation.

The present invention also discloses the application of the manganese chloride precursor solution in the preparation of the copper mesh coated with manganese molybdate, or the application of the copper mesh coated with manganese molybdate in the separation of oil-water emulsion or degradation of organic pollutants in water, or the application of manganese molybdate as a semiconductor photocatalyst in the separation of oil-water emulsions or degradation of organic matter in water.

In the present invention, when oil-water separation is performed, the oil-water to be separated is an oil-water emulsion; when degrading organic matter in water, the organic matter is preferably methylene blue.

In the present invention, manganese molybdate is used as a semiconductor photocatalyst for the first time in the technical field of oil-water emulsion separation; it can be used to degrade various organic pollutants, and has excellent performance.

The invention synthesizes a manganese molybdate-coated copper mesh by hydrothermal method in two steps, and has the functions of separating emulsion and degrading organic pollutants. This material is simple to prepare, raw materials are easy to obtain, and it has good separation effect, good circulation, and has good application prospects in industrial sewage treatment and emulsion separation.

DETAILED DESCRIPTION OF THE INVENTION

Embodiment 1

The preparation of the manganese chloride precursor solution is as follows:

Dissolving 2.47 g of manganese chloride tetrahydrate in 100 ml of water at room temperature, and stirring for 20 minutes; adding 3.68 g of sodium citrate dihydrate powder to the above solution, continuously stirring until the solution is colorless and transparent. Finally, adding 1.35 g of sodium carbonate and stirring for 20 minutes to obtain a manganese chloride precursor solution.

At room temperature, dissolving 2.62 g of sodium molybdate powder in 100 ml of water and stirring for 20 minutes to obtain a sodium molybdate solution.

The copper mesh is ultrasonically washed with acetone, ethanol and deionized water for 20 min, respectively. The SEM image is shown in FIG. 1.

The specific steps of the hydrothermal method are as follows:

Immersing the pretreated copper mesh in a manganese chloride precursor solution, and then transferring the solution and copper mesh to a 150 ml stainless steel autoclave, and reacting at 160° C. for 12 hours. After the reaction, taking out the copper mesh and washing twice with ethanol and deionized water to obtain the active copper mesh, and then immersing the reactive copper mesh in the sodium molybdate solution and putting in the autoclave for a second reaction, and reacting at 140° C. for 12 hours. After the reaction, taking the copper mesh out and washing it twice with ethanol and deionized water to obtain a copper mesh coated with manganese molybdate. The SEM image is shown in FIG. 1.

Figure 1:
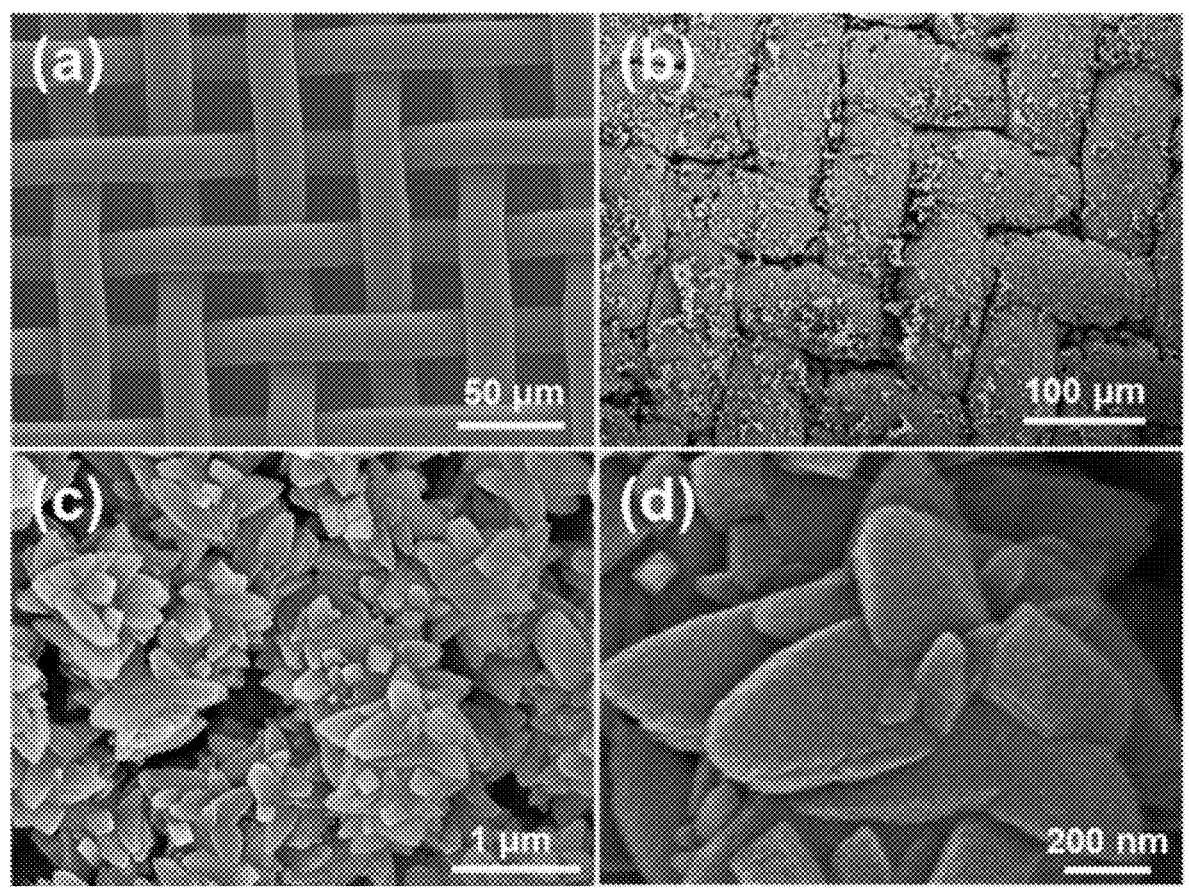
FIG. 1 is a scanning electron micrograph of copper mesh before and after reaction.

FIG. 1 is a SEM image of a copper mesh before and after reaction. (a) is a SEM image of copper mesh before reaction, (b), (c), and (d) are SEM images of products at different resolutions. It can be seen from the figure that a large amount of manganese molybdate uniformly grows on the surface.

Embodiment 2

Wettability test of the copper mesh coated with manganese molybdate.

Figure 2:
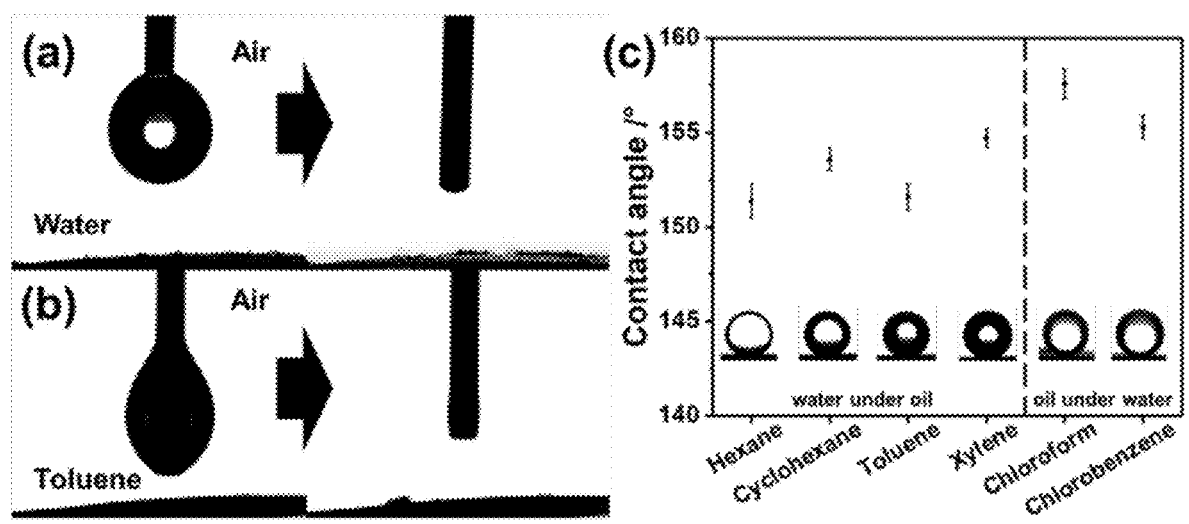
FIG. 2 is a wettability test of the manganese molybdate-coated copper mesh.

FIG. 2 is a wettability test. The manganese molybdate-coated copper mesh exhibits superhydrophilicity in the air. When the water droplets and the oil droplets contact the surface of the copper mesh, they spread rapidly and the contact angle is 0°. When the copper mesh is immersed in water, chloroform aggregates into a spherical shape on the surface of the copper mesh, and the contact angle is 157°; when the copper mesh is placed in toluene, the water droplets also aggregates into a spherical shape on the surface, and the contact angle is 151°. The results show that the modified copper mesh meets the wettability requirements for oil/water emulsion separation. In which, (a) is the contact angle of water in air, (b) is the contact angle of toluene in air, and (c) is the contact angle of several kinds of liquid drops.

Embodiment 3

The emulsion separation test, the specific steps are as follows:

10 ml of toluene is added to 90 ml of water, and then 50 mg of sodium dodecyl sulfate is added and stirring for 2 hours to prepare an emulsion, after which the prepared emulsion is used for the emulsion separation test.

Figure 3:
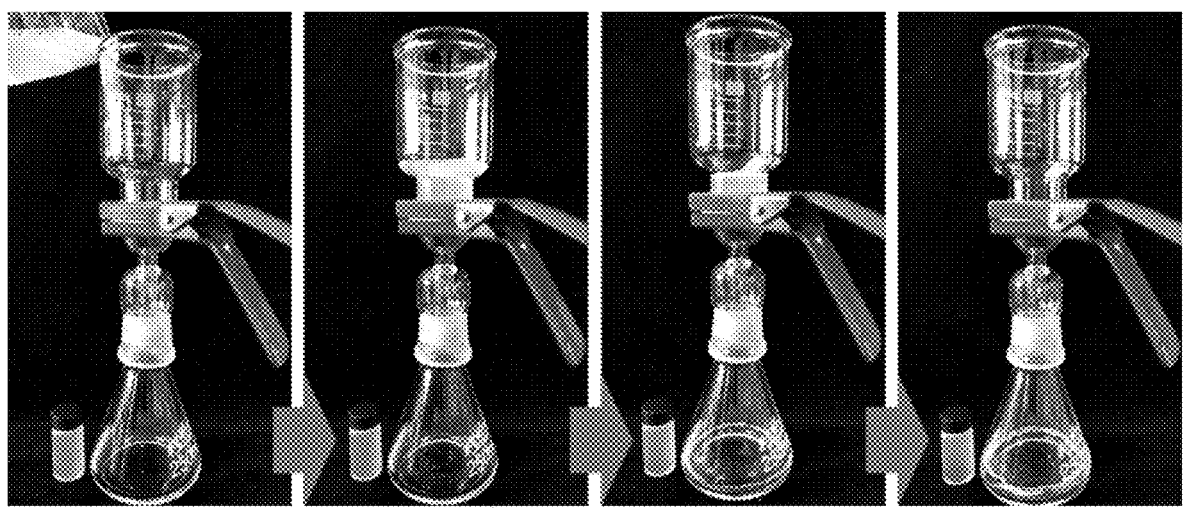
FIG. 3 is a separation test of the oil/water emulsion of the manganese molybdate-coated copper mesh.

A copper mesh coated with manganese molybdate obtained in embodiment 1 is placed in a glass filter, and then pouring in 100 ml oil-water emulsion. FIG. 3 is a step of separating the oil-water emulsion. As can be seen from the figure, after pouring the milky white oil-water emulsion into the glass filter, the purified water flows into the glass filter flask, indicating that it has good emulsion separation effectiveness.

Embodiment 4

Separation efficiency and flux test, the specific steps are as follows:

Calculation of separation efficiency and flux. The separation efficiency of the oil/water emulsion is calculated using the following equation:

$$R(\%) = (1 - Cp/Co) \times 100\%$$

Where R (%) is the oil displacement coefficient, and $Cp$ and $Co$ are the oil concentrations of the collected water and oil/water emulsion, respectively. Purified water is analyzed by UV-visible spectrophotometry. The flux of the emulsion is determined by calculating the amount of filtration per unit time according to the following equation:

$$\text{Flux} = V/At$$

Where A ($cm^2$) is the effective filtration surface of the membrane, V ($L/m^2h$) is the volume of the filtrate, and t (h) is the separation time. Pour the same amount of oil/water emulsion in each test.

Figure 4:
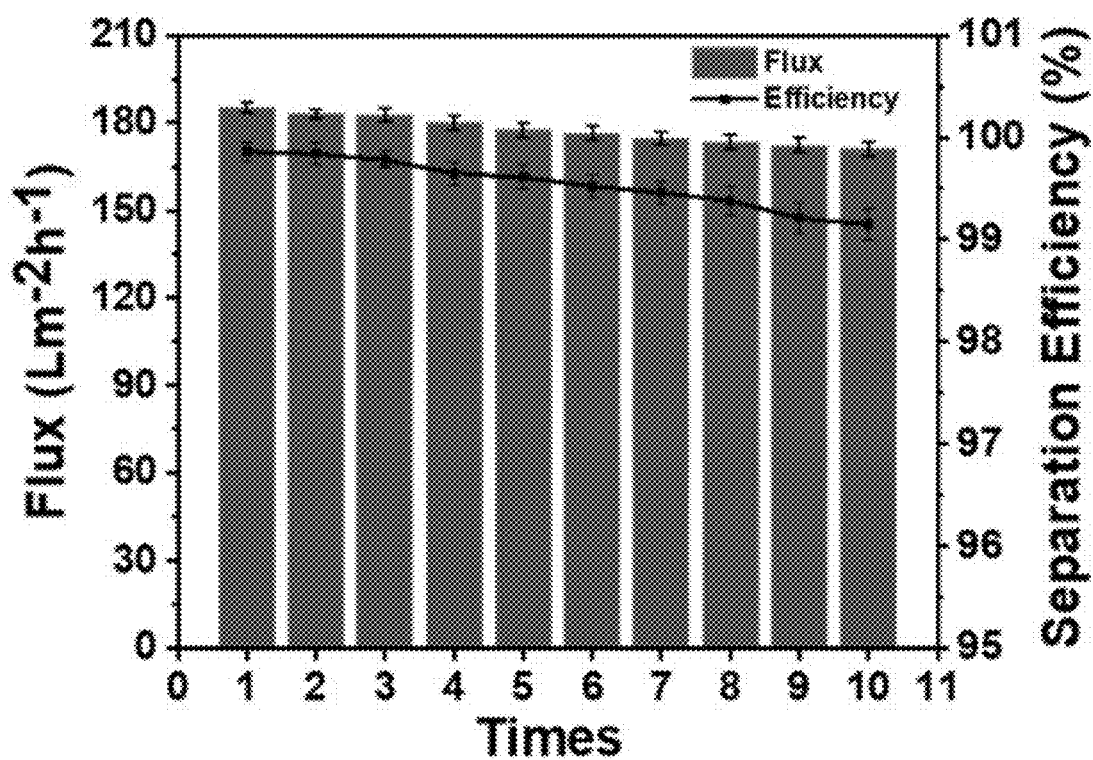
FIG. 4 is a cyclic efficiency test of the manganese molybdate-coated copper mesh.

FIG. 4 show the cyclic separation effect and flux of the material on the toluene-in water, hexane-in-water and xylene-in-water emulsions. It can be found that the material still maintains a good separation effect after the cycle test.

The dosage of sodium citrate dihydrate in Embodiment 1 is adjusted to 1.84 g, and the rest remains unchanged. The separation efficiency of the obtained manganese molybdate-coated copper mesh for oil-water emulsion separation for the first time is about 99.3%.

Embodiment 5

The test of the organic pollutant degradation, the specific steps are as follows:

Dissolve 5 mg of methylene blue in 1 L of deionized water, stir evenly to obtain a methylene blue solution at a concentration of 5 ppm, and then use the prepared solution for the organic pollutant degradation test.

Figure 5:
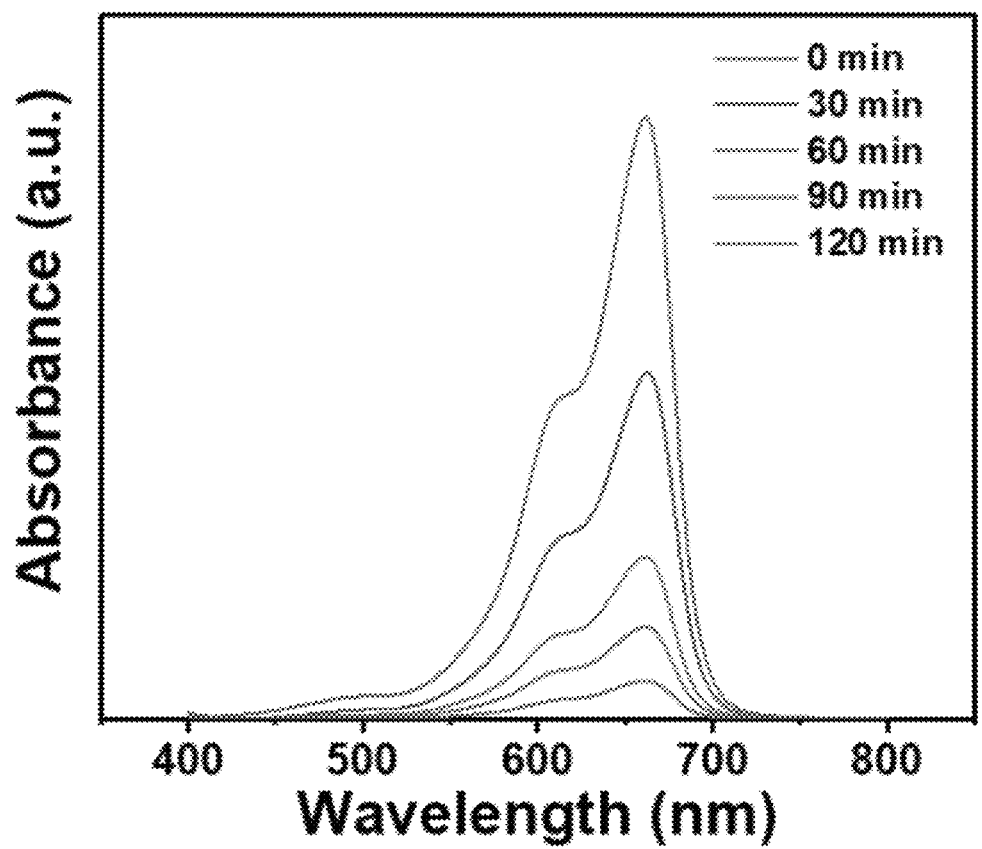
FIG. 5 is a photodegradation test of the manganese molybdate-coated copper mesh.

The copper mesh coated with manganese molybdate prepared in embodiment 1 is filled into a flask, and then pour into 100 ml of methylene blue solution, stir and degrade under ultraviolet light. FIG. 5 shows the change in the concentration of methylene blue solution with illumination time. After 120 minutes, the methylene blue in the solution is basically degraded completely.

The dosage of sodium citrate dihydrate in embodiment 1 is adjusted to 7.2 g, and the rest remain unchanged. Using the obtained manganese molybdate-coated copper mesh, after 90 minutes, methylene blue remained in the solution is 1.35 times of that in embodiment 1, and it takes about 160 minutes for the methylene blue in the solution to degrade completely.

Conclusion

Through the above analysis, the present invention synthesizes a manganese molybdate-coated copper mesh by a hydrothermal method in two steps, which has the functions of separating the emulsion and degrading organic pollutants. The material has the advantages of simple preparation; easy availability of raw materials, good separation effect and good cycle ability, and it has good application prospects in industrial sewage treatment and emulsion separation.

The invention claimed is:

1. A method for preparing a copper mesh coated with manganese molybdate, comprising the following steps:
   immersing a pretreated copper mesh in a manganese salt precursor solution and hydrothermally reacting to obtain a reactive copper mesh; and
   immersing the reactive copper mesh in a sodium molybdate solution and hydrothermally reacting to obtain the copper mesh coated with manganese molybdate;
   wherein the manganese salt precursor includes manganese salt, sodium carbonate, and sodium citrate.

2. The method according to claim 1, wherein the manganese salt is manganese chloride tetrahydrate; the copper mesh is ultrasonically cleaned with acetone, ethanol and deionized water separately to obtain pretreated copper mesh.

3. The method according to claim 1, further comprising, at room temperature, dissolving the manganese salt in water, stirring and adding sodium citrate powder in, and after stirring until the solution is colorless and transparent, adding sodium carbonate powder to obtain the manganese salt precursor solution.

4. The method according to claim 1, wherein the hydrothermal reaction to obtain the reactive copper mesh is carried out at the temperature of 160° C. for 12 hours; the hydrothermal reaction to obtain the copper mesh coated with manganese molybdate is carried out at the temperature of 140° C. for 12 hours.

5. The method according to claim 1, wherein the mass ratio of the manganese salt, sodium carbonate and sodium citrate is 2.47:1.325:3.68; the amount of substance ratio of sodium molybdate and manganese salt is 1:1.

6. The method according to claim 1, further comprising applying the copper mesh coated with manganese molybdate in the separation of oil-water emulsion or degradation of organic pollutants in water.

7. The method according to claim 1, further comprising applying the manganese molybdate as a semiconductor photocatalyst in the separation of oil-water emulsions or degradation of organic matter in water.

* * * * *